3,577,462
N-ARYLALKYL-β-HYDROXY-β-PHENYL-ETHYL-
AMINES AND THE SALTS THEREOF
William F. Bruce, Havertown, Pa., assignor to American
Home Products Corporation, New York, N.Y.
No Drawing. Continuation-in-part of application Ser. No.
502,370, Oct. 22, 1965. This application Aug. 8, 1968,
Ser. No. 751,028
Int. Cl. C07c 91/22
U.S. Cl. 260—570.6
6 Claims

ABSTRACT OF THE DISCLOSURE

Diaralkylamines are prepared by prolonged reaction of styrene oxide with dialkylaminoalkyl, hydroxyalkyl, halobenzyl, and heteroalkyl amines. The compounds show central nervous system depressant activity.

---

This application is a continuation-in-part of application Ser. No. 502,370, filed Oct. 22, 1965 and now abandoned.

This invention relates to diaralkylamine derivatives and the method for producing them. More particularly, the invention involves certain tertiary hydroxyaralkyl-amines having useful pharmacological activity.

The compounds sought to be patented are those which

where R represents either halobenzyl, preferably dichlorobenzyl, or hetero-monocyclicalkyl where the alkyl moiety has from 1 to 2 carbon atoms, preferably a methylpyridylmethyl, lower alkenyl of 2 to 4 carbon atoms, a dialkylaminoalkyl with the alkyl groups ranging from 1 to 3 carbon atoms, and mono- or di-hydroxyalkyls in which the alkyl moiety has from 3 to 6 carbon atoms. The radicals $R^1$ and $R^2$ are each hydroxyaralkyls. Of particular interest are those compounds where $R^1$ or $R^2$ represents a beta-hydroxy-beta-phenylethyl radical.

The compounds falling within the scope of the invention have been found to possess in common a central nervous system activity when tested pharmacologically in mice, demonstrating particularly a central nervous system depressant action below the toxic level as determined under standard or scientifically acceptable testing procedures. Additionally, certain of the compounds have also demonstrated an antitremarine activity and one compound has shown not only said CNS action but also anticonvulsant and bronchodilator activity while another showed analgesic action. These pharmacodynamic activities indicate utility in the field of experimental and comparative pharmacology.

To evaluate the compounds pharmacologically, they are submitted to various experimental and comparative procedures, a few of which are now described.

The compound to be tested is administered orally to three mice (CF-1 14 to 24 grams) at each of the following doses: 400, 127, 40, 12.7 mg./kg. and lower doses when desirable.

The animals are watched for a minimum of two hours during which time signs of general stimulation (e.g. increased spontaneous motor activity, hyperactivity on tactile stimulation, twitching), general depression (e.g. decreased spontaneous motor activity, decreased respiration) and autonomic activity (e.g. miosis, mydriasis, diarrhea) are noted. The animals are tested for changes in reflexes (e.g. flexor, extensor) are are rated by use of a pole climb and inclined screen for the presence of sedation-ataxia. The "Eddy Hot-Plate Method" (Nathan B. Eddy and Dorothy Leimbach, J. Pharmacol. Exper. Therap. 107:385, 1953) is used to test for analgesia. This experiment is terminated by subjecting each animal to a maximal electroshock to test for anticonvulsant activity.

If the compound demonstrates very low or no activity in the above procedure following oral administration, the procedure is repeated following intraperitoneal administration.

For other anticonvulsant activity (anti-metazol), a compound at selected dosage levels is administered orally (or intraperitoneally) to groups of six mice (3 males and 3 females). One hour later (or one-half hour later if the compound was administered i.p.) the animals are challenged with metrazol 125 mg./kg., i.p. The incidence of clonic and tonic convulsions and deaths is observed for one-half hour. Protection against convulsions and death is determined by comparison with controls run simultaneously. An $ED_{50}$ against convulsions and/or death is calculated from probit-log dose curves and evaluated in the light of known anticonvulsants and tranquilizers.

For antitremorine activity (indicating possible anti-Parkinsonian action) the test follows in general the procedure indicated in the publication Science 124: 79, 1956. With respect to tests for bronchodilator activity, a procedure which will elicit the desired effect is described in the J. Pharmacology 90: 254, 1947 and in 97: 14, 1949.

The tertiary amines of the invention are prepared by reacting styrene oxide with a selected amine of the formula $RNH_2$, wherein R has the significance as previously indicated. The reaction is carried out in an alcoholic solvent, preferably ethanol, at about steam bath temperature for a period up to about 3 hours following which the reaction mixture is held for a substantial period of time at room temperature, preferably for about 10 to 20 days.

The following examples are intended primarily as illustrative of the best mode contemplated for carrying out the invention and in the interests of greater detail. It is to be understood that the quantities and temperatures are in the metric system.

EXAMPLE 1

α,α'-[(2-methyl-2-hydroxypentylimino)dimethylene] dibenzyl alcohol 12 g. of styrene oxide and 12 g. of 1-amino-2-methyl-pentanol in 50 ml. of ethanol heated overnight on a steam bath gave on distillation 5 g. product $b_{0.3}$ 215–20°, a viscous yellow oil.

Analysis.—Calcd. for $C_{22}H_{31}NO_3$ (percent): C, 73.91; H, 8.74; N, 3.92. Found (percent): C, 73.97; H, 8.18; N, 3.83.

The product demonstrated CNS depressant activity as well as analgesic action, when administered orally to mice in a single dose of about 40 mg./kg.

EXAMPLE 2

α,α'-[(2,3-dihydroxypropylimino)dimethylene] dibenzyl alcohol 12 g. of styrene oxide and 9.1 g. of 1-amino-2,3-propanediol in 50 ml. of ethanol was allowed to stand 2 days at room temperature, then concentrated on a steam bath and distilled to give 3.2 g. of a dark yellow very viscous oil, $b_{0.1}$ 265–273°.

Analysis.—Calcd. for $C_{19}H_{25}NO_4$ (percent); C, 68.86; H, 7.60; N, 4.23. Found (percent): C, 68.60; H, 7.27; N, 4.56.

This product showed, on oral administration, a CNS depressant activity in mice at a single dose in the range of 12.7 to 40 mg./kg.

EXAMPLE 3

α,α'-[(allylimino)dimethylene]dibenzyl alcohol

A mixture of 24 g. of styrene oxide and 6 g. of allylamine stood for 3 weeks and was then distilled to give a colorless oil, like glycerol in appearance.

The residue was distilled to give 25 g. of yellow viscous oil $b_{0.3}$ 210–214°.

*Analysis.*—Calcd. for $C_{19}H_{23}NO_2$ (percent): C, 76.73; H, 7.80; N, 4.71. Found (percent): C, 76.65; H, 7.61; N, 4.72.

This compound by the described testing procedure showed CNS depressant activity at about 127 mg./kg. given orally.

EXAMPLE 4

α,α'-([2-(dimethylamino)propylimino]dimethylene) dibenzyl alcohol

A solution of 12 g. of styrene oxide and 11 g. of $N^2,N^2$-dimethyl-1,2-propanediamine in 30 ml. of ethanol was allowed to stand overnight and then heated 3 hours on a steam bath. It was concentrated on a water pump to give a yellow sirup, which on standing overnight began to crystallize in long needles, which were collected on a filter.

The filtrate on distillation gave 8.5 g. of pale yellow oil $b_1$ 165–70°, from which was obtained 4.5 g. of yellow viscous oil $b_{0.3}$ 210–215°, of the title product.

*Analysis.*—Calcd. for $C_{21}H_{30}N_2O_2$ (percent): C, 73.64; H, 8.83; N, 8.18. Found (percent): C, 73.56; H, 8.54; N, 8.33.

This compound, when evaluated pharmacologically, showed CNS depressant activity when administered orally to mice in a dosage range of 40–127 mg./kg.

EXAMPLE 5

α,α'-[(3,4-dichlorobenzylimino)dimethylene] dibenzyl alcohol

A solution of 6 g. of styrene oxide and 9 g. of 3,4-dichlorobenzylamine in 40 ml. of absolute ethanol stood for two days and was then concentrated and distilled to give 8 g. of a pale yellow oil $b_{0.1}$ 185–190°.

The residue from the distillation was dissolved in ether and by addition of a solution of HCl in ether was converted to 1.5 g. of the hydrochloride salt of the title product in the form of a white solid which was recrystallized from alcohol to give 1.2 g. of white crystals m. 169–70° dec.

*Analysis.*—Calcd. for $C_{23}H_{24}Cl_3NO_2$ (percent): C, 61.00; H, 5.34; Cl, 23.50; N, 3.09. Found (percent): C, 61.20; H, 5.14; Cl, 24.0; N, 3.29.

This compound when tested for central nervous system activity showed depressant action in mice when administered orally or intraperitoneally, in the latter case at a dose in the range of 12.7 to 40 mg./kg.

EXAMPLE 6

α,α'-([2-(diisopropylamino)ethylimino] dimethylene)dibenzyl alcohol

A solution of 12 g. of styrene oxide and 15.5 g. of N,N-di-isopropyl-ethylenediamine in 100 ml. of absolute alcohol stood for two days and was then concentrated and distilled to give 5 g. of pale yellow viscous oil $b_{0.5}$ 225–235° of the title product.

*Analysis.*—Calcd. for $C_{24}H_{36}N_2O_2$ (percent): C, 74.96; H, 9.44; N, 7.29. Found (percent)3: C, 74.67; H, 9.19; N, 7.19.

The product, under the described testing procedure, showed CNS depressant activity when administered orally to mice at a dose of about 127 mg./kg.

EXAMPLE 7

α,α'-[(2-dimethylamino-1-methylethylimino) dimethylene]dibenzyl alcohol

A mixture of 38 g. of styrene oxide and 20 g. of $N^1,N^1$-dimethyl-1,2-propanediamine stood on a steam bath overnight and gave on distillation 20 g. $b_{0.1}$ 128–136° which largely solidified on standing, but the solid isolated refused to crystallize from hexane and the fraction was redistilled to give 17 g. of colorless oil $b_{0.1}$ 130–5°, identified as follows:

*Analysis.*—Calcd. for $C_{13}H_{22}N_2O$ (percent): C, 70.23; H, 9.97; N, 12.60. Found (percent): C, 70.52; H, 9.72; N, 11.15.

The residues of the above distillations gave on distillation 22 g. of very viscous yellow oil $b_{0.1}$ 185–90°, identified as the title product.

*Analysis.*—Calcd. for $C_{21}H_{30}N_2O_3$ (percent): C, 73.64; H, 8.83; N, 8.18. Found (percent): C, 73.51; H, 8.66; N, 8.42.

This product showed CNS depressant activity at an oral dosage of 40 mg./kg. or somewhat below.

EXAMPLE 8

α,α'-[(2-dimethylaminoethylimino)dimethylene] dibenzyl alcohol

A mixture of 30 g. of styrene oxide and 18 g. of dimethylaminoethylamine was warmed on a steam bath overnight and then distilled to give two fractions, one $b_{0.1}$ 128–134° and 11 g. of a higher boiling fraction $b_{0.1}$ 194–8°.

The 194–8° fraction was the title product, refractive index $n_D^{24}$ 1.5465, obtained as a viscous pale yellow oil.

*Analysis.*—Calcd. for $C_{20}H_{28}N_2O_2$ (percent): C, 73.13; H, 8.59; N, 8.53. Found (percent): C, 73.29; H, 8.34; N, 8.24.

The product when tested experimentally in mice showed a CNS depressant action at about 5 to 12.7 mg./kg. administered orally. Additionally, this compound showed bronchodilator activity in guinea pigs when injected at a dose of 25 mg./kg.

EXAMPLE 9

α,α'-([6-methyl-2-pyridylmethylimino]-dimethylene) dibenzyl alcohol

A mixture of 12 g. of styrene oxide and 12 g. of 2-aminomethyl-6-methylpyridine stood for 3 days and became much more viscous. On distillation, it gave 5 g. $b_{0.1}$ 185–7° and 7 g. $b_{0.1}$ 240–5°, both viscous yellow oils.

The lower boiling fraction analyzed for $C_{15}H_{18}N_2O$—Calcd. (percent): C, 74.35; H, 7.49; N, 11.56. Found (percent): C, 74.06; H, 7.30; N, 11.65.

The higher boiling fraction analyzed for $C_{23}H_{26}N_2O_2$—Calcd. (percent): C, 76.21; H, 7.23; N, 7.73. Found (percent): C, 75.99; H, 6.96; N, 7.65.

The title product, when submitted to the described CNS pharmacological evaluation procedure showed CNS depressant activity within the oral dosage range of 5 to 127 mg./kg.

The compounds of the invention may be utilized either as the free base or in the form of nontoxic or pharmaceutically acceptable, acid-addition salts. The latter are prepared from organic or inorganic acids by reacting the bases with the selected acid substance in well-known manner, one method being exemplified above. Examples of acids which may be used, in addition to that already disclosed, are sulfuric, phosphoric, hydrobromic, acetic, fumaric, maleic, tartaric, or the like.

To prepare the compounds in dosage forms, they may be combined with various solid or liquid extenders, carriers or excipients, depending on whether they are to be used orally or parenterally. Oral forms may be prepared in the form of tablets, capsules, or liquid suspensions. For parenteral applications, compositions may be prepared in an aqueous or oleaginous vehicle. Pharmacological activity is achieved at a dosage range generally from 5 to 127 mg./kg. of body weight.

The invention claimed is:

1. A tertiary amine having the formula:

in which R is a member of the group consisting of dichlorobenzyl, allyl, dimethylamino(lower)alkyl, said lower alkyl moiety having 2 to 3 carbon atoms, monohydroxy (lower)alkyl and dihydroxy(lower)alkyl in which the alkyl moieties of the last two radicals have 3 to 6 carbon atoms, while $R^1$ and $R^2$ each represents β-hydroxy-β-phenethyl.

2. A compound of claim 1; α,α'-[(2-methyl-2-hydroxypentylimino)dimethylene]dibenzyl alcohol.

3. A compound of claim 1; α,α'-[(2,3-dihydroxypropylimino)dimethylene]dibenzyl alcohol.

4. A compound of claim 1; α,α'-([2-dimethylamino)propylimino]dimethylene)dibenzyl alcohol.

5. A compound of claim 1; α,α'-[(3,4-dichlorobenzylimino)dimethylene]dibenzyl alcohol.

6. A compound of claim 1; α,α'-[(2-dimethylaminoethylimino)dimethylene]dibenzyl alcohol.

References Cited

UNITED STATES PATENTS 3,517,000   6/1970   Bruce _____ 260—570.6X

ROBERT V. HINES, Primary Examiner

U.S. Cl. X.R.

260—297, 501.18, 583, 854; 424—263, 330